United States Patent [19]

Sousa et al.

[11] Patent Number: 5,189,753
[45] Date of Patent: Mar. 2, 1993

[54] AUTOMOBILE VACUUM CLEANER

[75] Inventors: Lawrence Sousa, Ancaster; Duncan Hill, Ottawa, both of Canada

[73] Assignees: Central Auto-Vacc Ltd., Ancaster, Canada; Zee Investments Limited, Grand Cayman, Cayman Islands

[21] Appl. No.: 700,417

[22] Filed: May 15, 1991

[51] Int. Cl.$^5$ ............................ A47L 5/38; B60S 1/54; B60S 1/64
[52] U.S. Cl. ...................................... 15/313; 15/327.7; 15/353
[58] Field of Search .............. 15/313, 353, 314, 327.7; 180/89.11

[56] References Cited

U.S. PATENT DOCUMENTS

| | | | |
|---|---|---|---|
| 2,306,212 | 12/1942 | Gerstmann | 15/353 X |
| 2,539,867 | 1/1951 | Schnabel | 15/353 X |
| 2,639,005 | 5/1953 | Gerstmann | 15/353 X |
| 3,431,581 | 3/1969 | Booth | 15/313 |
| 3,449,787 | 6/1969 | Rothstein et al. | 15/313 |

Primary Examiner—Chris K. Moore
Attorney, Agent, or Firm—Breiner & Breiner

[57] ABSTRACT

This specification discloses a central vacuum cleaning system for use in a motor vehicle, which is self-contained and portable and is installed in a convenient part of the car such as the trunk. The unit is powered by the battery of the vehicle and does not require access to public power facilities. The cleaning unit is installed for easy placement and removable in the vehicle, with snap-in hose connections for convenience. The vacuum cleaner central unit is formed in two parts which are easily opened by a snap means for emptying the waste collection chamber. The waste collection chamber is designed such that debris and liquid waste remain in the bottom of the chamber during operation and during the emptying procedures, so that such wastes do not reach the filter and the electric motor area of the unit.

4 Claims, 3 Drawing Sheets

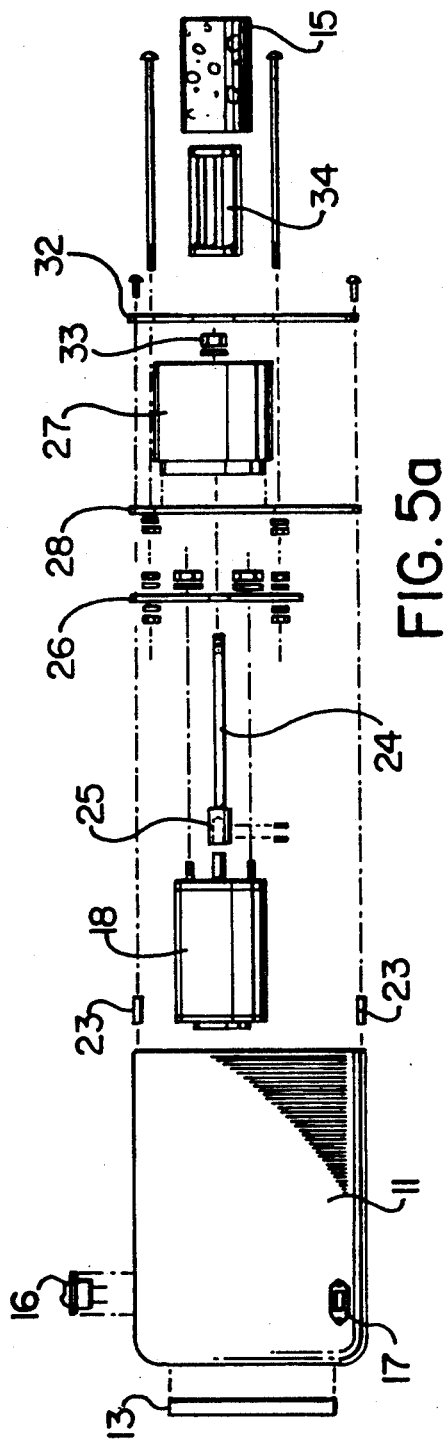
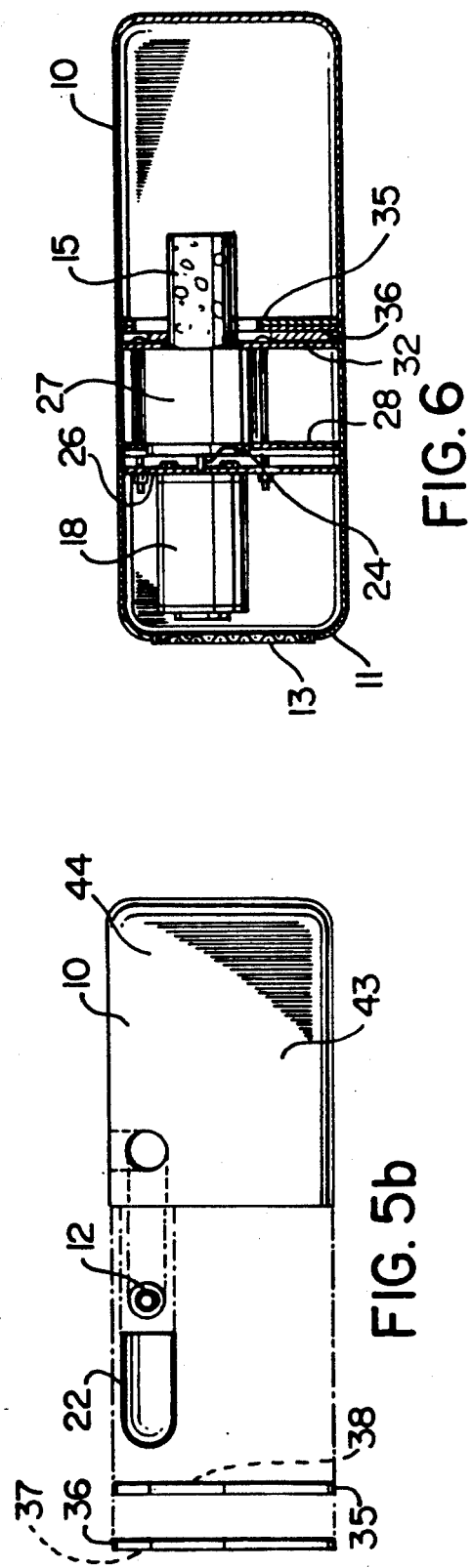
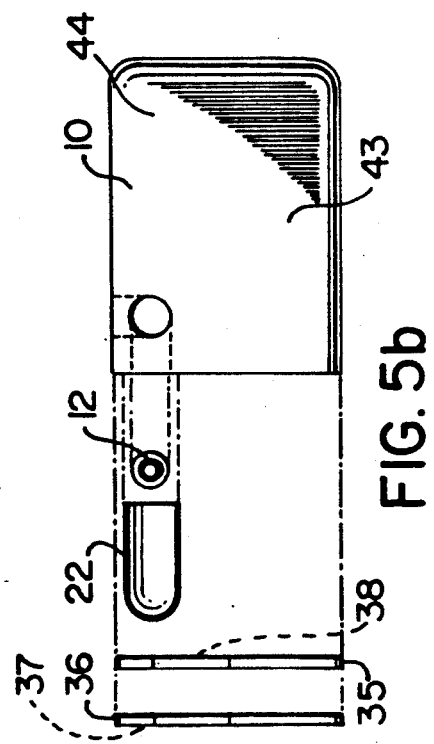

AUTOMOBILE VACUUM CLEANER

This invention relates to an improved vacuum cleaning system for use in motor vehicles and the like. The invention relates more specifically to a vacuum cleaning system which is operated from a vehicle battery and accordingly does not require access to public power facilities. The unit can if desired be used while the vehicle is in motion.

Many units of this type have been disclosed over the years, all of which suffer from disadvantages which have effectively prevented widespread use of devices of this type.

An example of system of the general type envisaged by the present invention is shown in the Rothstein et al U.S. Pat. No. 3,449,787 issued Jun. 17, 1969, the contents of which are incorporated herein by reference. The Rothstein et al patent illustrates the function and operation of some parts of the present invention in some detail. However, it should be noted that the Rothstein et al patent does not disclose a structure which will yield the benefits of the present invention.

Thus the present invention provides in one aspect a central vacuum cleaner assembly which is adapted for use in a vehicle such as an automobile. The assembly comprises a waste collection chamber and an air withdrawal chamber which are detachably held together in a suitable manner. The waste collection chamber includes an intake opening and an outlet opening, and said intake opening is adapted to cooperate with a conventional vacuum cleaner line. A baffle means associated with the waste collection chamber cooperates with the intake opening to divert incoming air flow away from the outlet opening and to permit particulate and liquid waste material to fall by gravity towards a waste retaining section of the collection chamber, which is located in a lower part of the collection chamber in normal use.

The air outlet opening leading from the waste collection chamber to the air withdrawal chamber includes a waste retaining means comprising a partition which is adapted to retain particulate and liquid waste by gravity in the waste retaining section of the collection chamber. The outlet cooperates with an air filter for removal of fines from the air stream and thus the partition and air filter permit free exit of filtered air from the waste collection chamber and entry of said filtered air into the air withdrawal chamber.

There is an electric motor and associated fan impeller means in the air withdrawal chamber to draw filtered air into the air withdrawal chamber, and to expel the air through an outlet to the atmosphere, normally the trunk of a car or other vehicle space.

The assembly is designed to be easily and releasably installed, and readily removed, from the vehicle space, and the waste collection chamber and air withdrawal chamber are designed so as to be easily taken apart so that the waste collection chamber may be emptied, and the filter conveniently cleaned, when necessary.

The following is a list of drawings which form a part of this application.

FIGS. 5(a) and (b) shows an exploded side elevation view of the air withdrawal chamber, and FIG. 6 shows a partial section side elevation of the assembly of FIGS. 1 to 5 in assembled form.

Figure 7:
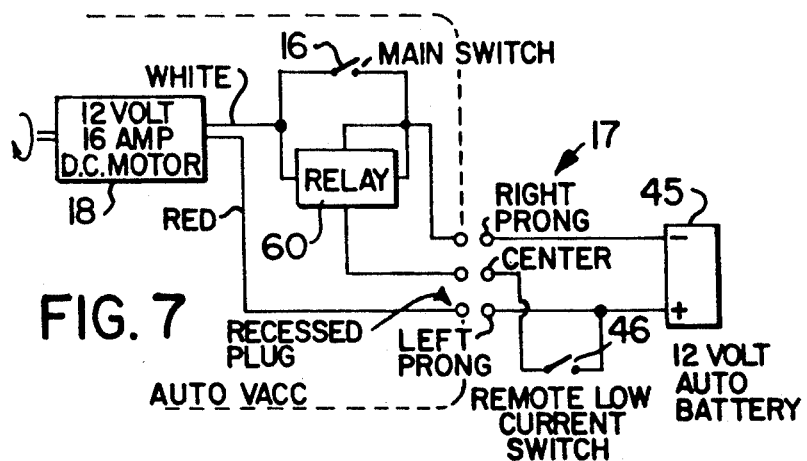

FIG. 7 shows semi-schematically a typically electrical wiring for this embodiment of this invention.

Figure 8:
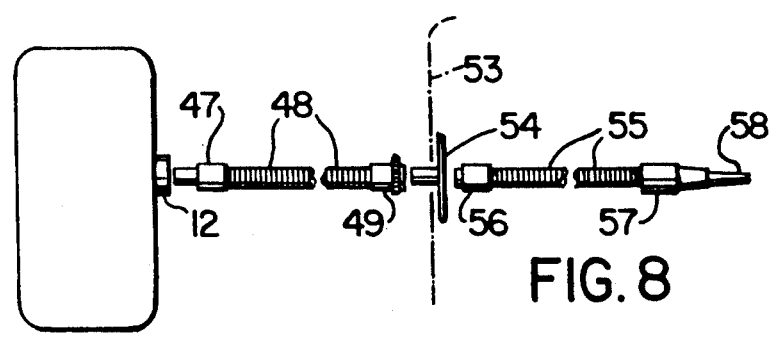

FIG. 8 shows a typical quick connect arrangement of vacuum hoses for use of the cleaning assembly in a typical motor vehicle situation.

Figure 9:
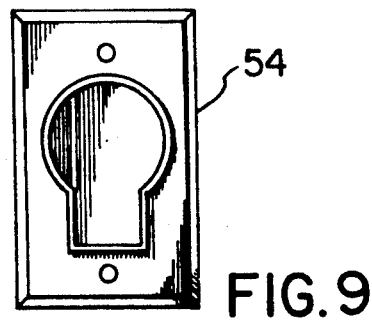
Figures 10, 11, 12, 13:
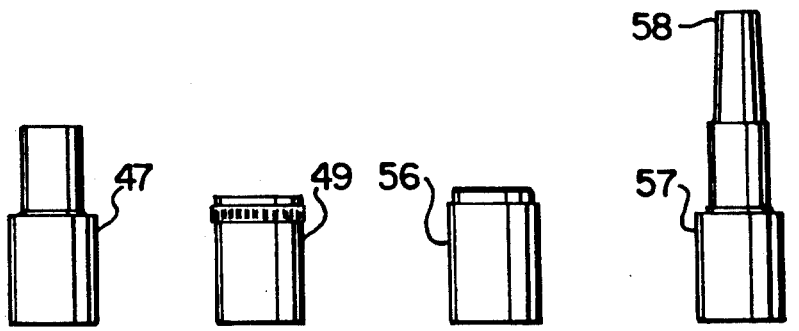

FIG. 9 shows a typical vehicle interior surface port.

FIGS. 10 to 13 show various parts of a typical hose assembly.

Figure 1:
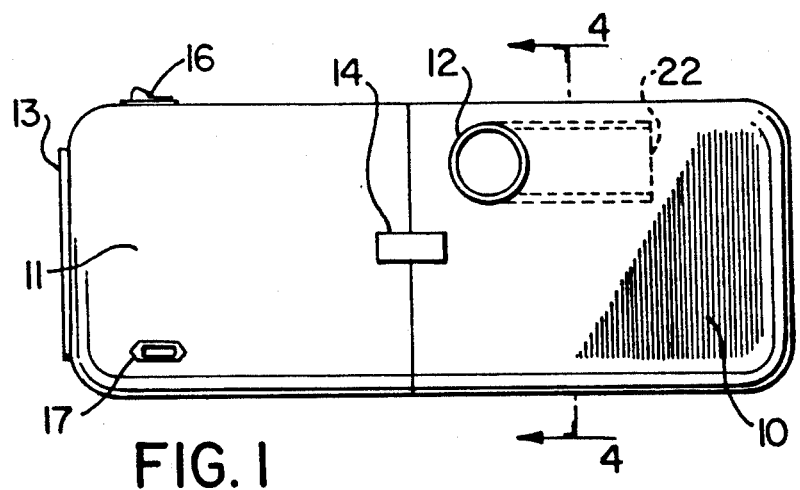
FIGS. 1 to 3 show different views of the central waste collection and air withdrawal assembly.
Figure 2:
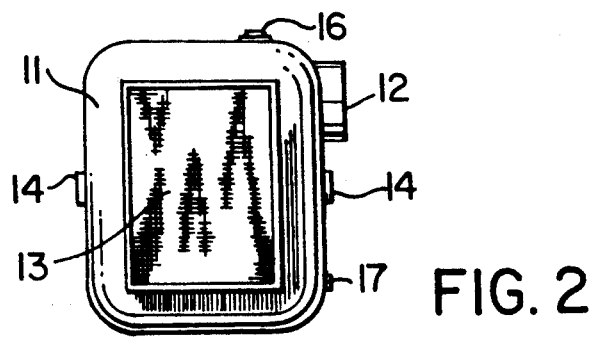
Figure 3:
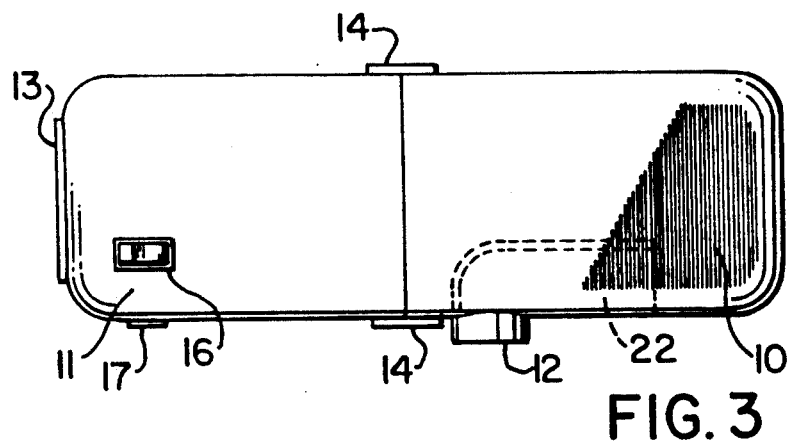

Referring now to FIG. 1, this is a side elevation of a typical central vacuum cleaning assembly adapted for use in a vehicle such as an automobile, and it includes a waste collection chamber 10 and an air withdrawal chamber 11. It includes an air inlet port 12 and an outlet for filtered air to the atmosphere 13. A conventional latch means 14 is used for convenient joining or detaching of the two main portions to form the assembly. This assembly is then easily adapted, by conventional easily detachable retaining means, such as clip or snap means, for installation in a vehicle, and for quick detachment after removal from a vehicle, for emptying of particles, debris, and liquid wastes from the waste collection chamber 10, and for occasional cleaning of the air filter means 15 (shown in FIG. 4). A main system switch 16 is installed on the top of the air withdrawal chamber at a convenient location. A power supply port 17 is provided on the casing of the air withdrawal chamber, which of course contains the electric motor 18 (shown in FIG. 5).

Figure 4:
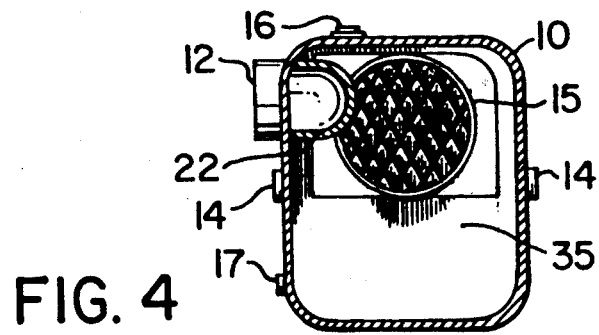
FIG. 4 shows a cross section 4—4 in FIG. 1.

Associated with inlet port 12 on the inside of the waste collection chamber 10 is a baffle means 22 shown in dotted lines in FIG. 1 and shown more clearly in FIG. 4, which is a cross section through the waste collection chamber at line 4—4 of FIG. 1.

In the embodiment shown in these figures baffle means 22 is a curved tunnel with smooth contours which channels the incoming air from a vacuum cleaner assembly into the waste collection chamber 10, at the same time diverting that material away from the waste collection chamber outlet, so that the heavier debris and liquid waste may settle by gravity to the lower part of the waste collection chamber, with relatively little or none of it being able to reach the waste collection chamber outlet opening and the associated filter means 15.

In FIG. 5, which is an exploded view of the two chambers of the assembly, some of these same elements may be seen, and additionally fan motor assembly mounting 23, dc motor 18 (12 volt, 16 amp), motor shaft extension 24 and shaft extension set screws 25, a motor mounting bracket 26 and associated mounting nuts and washers are shown. The motor mounting bracket 26 may have any suitable shape which does not interfere excessively with air flow through the chamber.

Also shown in FIG. 5 is a four-stage (two rotors and two stators) centrifugal fan assembly 27. A rear fan mounting bracket 28 and associated fan mounting nut 33 and washer are shown, in addition to a front end fan mounting bracket 32 and associated fan motor assembly securing screws.

A cup shaped filter 15 and filter support means 34 are shown in FIG. 5. As can be seen from these figures the motor fan 18 and filter assembly 15 are located in the upper portion of the chamber, as is the outlet port 38 of the waste collection chamber.

There is a waste retention plate 35 and associated gasket 36. Outlet openings 37 and 38 cooperate with filter 15 to provide an exit for filtered air to leave the waste collection chamber 10 and be drawn into the air withdrawal chamber 11.

Inlet port 12, including the associated inlet port exterior fastener, lead incoming dirt-laden air into the waste collection chamber 10 where the air stream meets curved baffle 22, which directs the air stream to the right in FIG. 6, in a direction away from the filter 15 and outlet opening 38. Liquid waste and particulate materials other than fine dust are caused to fall by gravity into the lower portion 43 of the waste collection chamber 10. As can be seen and understood easily from the drawings the unit will also operate well in a vertical position wherein the area of the waste collection chamber shown as 44 is at the bottom for gravity retention of the particulates and liquid waste. Thus the unit might usefully be placed in a vertical orientation in a recreational vehicle (RV), truck, or boat.

The basic dimensions determined for the unit which form the subject of these figures was determined by the space available in the trunk of an average automobile, anticipated volume of debris that might be collected and the two possible spatial orientations of the assembly. FIG. 6 shows these elements in operative assembled form.

In the embodiment shown in FIGS. 1 to 4 the assembly has the overall appearance of a rectangular box with rounded corners, with a height of 7½ inches, a horizontal width of 5¾ inches, and an overall length of 19½ inches. Of course these dimensions can be varied to suit the particular installation and performance parameters.

The positioning of the motor and fan system is such that liquid waste and particulate matter or debris is separated from the air stream prior to the air stream making contact with the filter 15 and subsequently with the fan blades. This prolongs the filter and fan blade life greatly and minimizes the risks of exposing the motor or wiring to moisture. The debris and liquid are separated by the baffle arrangement and remain in the lower portion of the waste collection chamber by gravity. Lighter airborne particles and fine dust arrive at the filter 15 and are removed from the air flow there. A useful type of removable air filter may be made of open-cell plastic foam, which is easily cleaned by shaking and occasionally by washing if the passages have become clogged by excessive fine dust. The filter may be made of other material, such as felt, paper, woven cloth or other materials adapted to the task.

Additional baffles may be installed in the waste bin and other expedients may be used such as spring loaded lids to close off openings in the device in the event of irregular handling such as might be caused by acceleration, hard braking, or cornering action, or during the removal of the unit for maintenance or emptying.

The assembly is well adapted for servicing and emptying, because of the unique design of the components and the overall shape of the assembly. The entire unit may easily be removed from the truck of a car and it may lie on its bottom or be stood on end. After removal from the vehicle the air withdrawal chamber with the motor, fan, etc. are unhooked and then the waste collection chamber 12 or waste bin can be emptied into a suitable garbage receptacle. At that time the air filter 15 could be cleaned if necessary.

The removal of the assembly from the car truck for emptying is an important aspect of the invention, since it reduces the problems associated with a removable tray or waste bin, which might spill or slop when inside the truck. The easy removal of the whole unit from the car truck is also important in the event that the unit has to be removed to make way for luggage or for removal to another vehicle, as well as facilitating basic maintenance of the unit.

The arrangement of parts and chambers as set out in this specification enables the elimination of a separate paper filter bag for the waste collection, since such paper bags are easily damaged by liquids or by debris. The use of the baffle and gravity system for collection of debris and liquid waste together with a relatively small and easy cleanable filter which is not in a position to be damaged by such materials is clearly advantageous in certain aspects of the use of this invention.

FIG. 7 shows semi-schematically the wiring diagram and certain elements used in the powering of the present invention. As is well known in wiring of systems of this type a relay 60 is advantageously employed for the purpose of turning on the dc motor 18 by relatively small remote low current switch 46 without the problems which would follow from the large currents employed to run the electric motor. Larger main switch 16 with heavier wiring can bypass the relay. The remote switch facilitates use of the actovacc from the interior of the car without direct access to the unit in the trunk.

The electric power from the 12 volt automobile battery 45 is provided to the electric motor 18 through power port 17 as previously stated.

FIG. 8 shows an embodiment of a hose assembly suitable for use in connection with this invention. Ready to be plugged into the inlet port 12 is a snap-in hose connector 47 joining hose 48 and leading to another connector 49 leading to a wall or a bulkhead 53 separating the car truck from the vehicle interior. Remote port 54 installed in partition 53 is accessible from the interior of the vehicle by hose 55 provided with a snap-in connector 56 at its proximal end and at its distal end with a further hose connector 57 adapted for deployment of a vacuum cleaner nozzle 58. The arrangement may be such that plugging the vacuum hose into the outlet can activate the autovacc automatically.

The various hoses or those connectors and nozzles are known in the art and may be chosen among parts readily available, for convenience and adaptability to the use set out for this invention.

Any standard corrugated or ribbed vacuum hose may be used for the connection to the automobile bulk-head and for the vacuum cleaning portion inside the vehicle interior. A fully collapsible or compressible ring type hose will save on storage space.

While one embodiment of this invention has been described above, it will be evident to those skilled in the art that changes and modifications may be made therein without departing from the essence of this invention, as set forth in the appended claims.

We claim:

1. A central vacuum cleaning assembly adapted for use in a vehicle comprising a waste collection chamber and an air withdrawal chamber;

said air withdrawal chamber including an electric motor driving a vacuum generating fan impeller;

said waste collection chamber being outside of and contiguous to said air withdrawal chamber and including an intake opening and an outlet opening, said outlet opening communicating directly with said air withdrawal chamber;

said intake opening adapted to cooperate with a tube leading to a vacuum cleaner nozzle, a baffle means cooperating directly with the intake opening to divert all incoming air flow and transported solids and liquids away from the outlet opening and permit particulate and liquid waste material to fall towards a waste retaining section of the waste collection chamber, said waste retaining section being located in a lower part of the waste collection chamber in normal use, said outlet opening leading from a higher part of the waste collection chamber to the air withdrawal chamber, said outlet opening cooperating with a waste retaining means comprising a partition, said partition being adapted to retain particulate and liquid waste in the waste retaining section of the waste collection chamber, said outlet opening cooperating directly with an air filter for removal of fine dust, said outlet opening and said filter permitting free exit of filtered air from the waste collection chamber and entry of said filtered air into the air withdrawal chamber, said air withdrawal chamber and said fan impeller being constructed and arranged to draw said filtered air into the air withdrawal chamber and to expel said air through an outlet in said air withdrawal chamber to the atmosphere, wherein the waste collection chamber and the air withdrawal chamber are releasably held together by a latching means, such that the exterior of the vacuum cleaner assembly is partially formed by the exterior of said waste collection chamber, and partially formed by the exterior of the air withdrawal chamber, which allows for separation of said waste collection chamber and said air withdrawal chamber to allow for emptying of the waste collection chamber.

2. A central vacuum cleaning assembly as in claim 1, wherein the intake opening is provided with a snap-in port for convenient connection and disconnection from the vacuum cleaner line.

3. A central vacuum cleaning assembly as in claim 1, wherein the tube which cooperates with said intake opening is a vacuum cleaner hose.

4. A central vacuum cleaning assembly as in claim 3, adapted for installation in a trunk of an automobile or like vehicle, said trunk being separated from a passenger compartment or the like by a bulkhead, said vacuum cleaner hose traversing said bulkhead and being provided with a snap-in remote port at a point in the automobile passenger compartment which is easily accessible for snap-in with a vacuum cleaner hose and head assembly.

* * * * *